United States Patent [19]
Sakamoto et al.

[11] Patent Number: 6,028,779
[45] Date of Patent: Feb. 22, 2000

[54] POWER INVERTER DEVICE

[75] Inventors: Kiyoshi Sakamoto; Takashi Ikimi; Kenichi Onda, all of Hitachi; Masahiro Tobise, Hitachinaka, all of Japan

[73] Assignee: Hitachi, Ltd., Tokyo, Japan

[21] Appl. No.: 09/199,584

[22] Filed: Nov. 25, 1998

[30] Foreign Application Priority Data

Nov. 25, 1997 [JP] Japan .................................. 9-322677

[51] Int. Cl.⁷ ...................... H02H 7/122; H02M 7/5387
[52] U.S. Cl. ............................................ 363/55; 363/132
[58] Field of Search ............... 363/55, 56, 132, 363/141, 144

[56] References Cited

U.S. PATENT DOCUMENTS

| | | | |
|---|---|---|---|
| 5,414,616 | 5/1995 | Hatozaki | 363/132 |
| 5,623,399 | 4/1997 | Ishii et al. | 363/132 |
| 5,671,134 | 9/1997 | Nomura et al. | 363/132 |

FOREIGN PATENT DOCUMENTS

| | | |
|---|---|---|
| 7-131981 | 5/1995 | Japan . |
| 7-203686 | 8/1995 | Japan . |

OTHER PUBLICATIONS

Christopher A. Dimino et al., "A Low Inductance, Simplified Snubber, Power Inverter Implementation" (HFPC Apr. 1994 Processings, pp. 502–509).

James A. Allocco et al. "Laminated Bus Bars Reduced Inductance and Manufacturing Costs of Power Distribution Circuits" (PCIM, Nov. 1996, pp. 54–56).

T. Schütze et al. "Low Floor Trams with IGBT–3–Level Inverter" (Dec. 1993, The European Power Electronics Association, pp. 92–96).

*Primary Examiner*—Matthew Nguyen
*Attorney, Agent, or Firm*—Kenyon & Kenyon

[57] ABSTRACT

In order to provide a power inverter device which can reduce surge voltages in all of the operating conditions thereof and has a simple structure, in a neutral point clamped 3 level type power inverter device formed by connecting semiconductor switching elements, diodes and smoothing use capacitors connected via plate shaped conductors, a first plate shaped conductor connects the diodes and the smoothing use capacitors and a plurality of plate shaped conductors connecting the elements are disposed over the first plate shaped conductor and separated from it by an insulating material.

33 Claims, 10 Drawing Sheets

WHEN 13 IS ON

FIG. 9B

WHEN 13 IS OFF

POWER INVERTER DEVICE

BACKGROUND OF THE INVENTION

1. Field of the Invention

The present invention relates to a power inverter device using switching elements, more specifically, to a power inverter device which can reduce a surge voltage induced during switching of semiconductor switching elements therein.

2. Conventional Art

It has been known that in a power inverter device constituted by using semiconductor switching elements a spike shaped surge voltage is induced during switching of the semiconductor switching elements. When assuming a stray parasitic inductance of power distribution buses themselves of the device is L and current variation rate thereof is di/dt, a surge voltage having magnitude of −L·di/dt is induced therein. In these days the switching speed of the semiconductor switching elements is increased as well as the current variation rate, which is also increased. Thereby the level of the induced surge voltage tends to increase. For this reason, in order to protect semiconductor switching elements from such surge voltage, many technical measures for reducing inductance of the power distribution buses are proposed.

Figure 10:
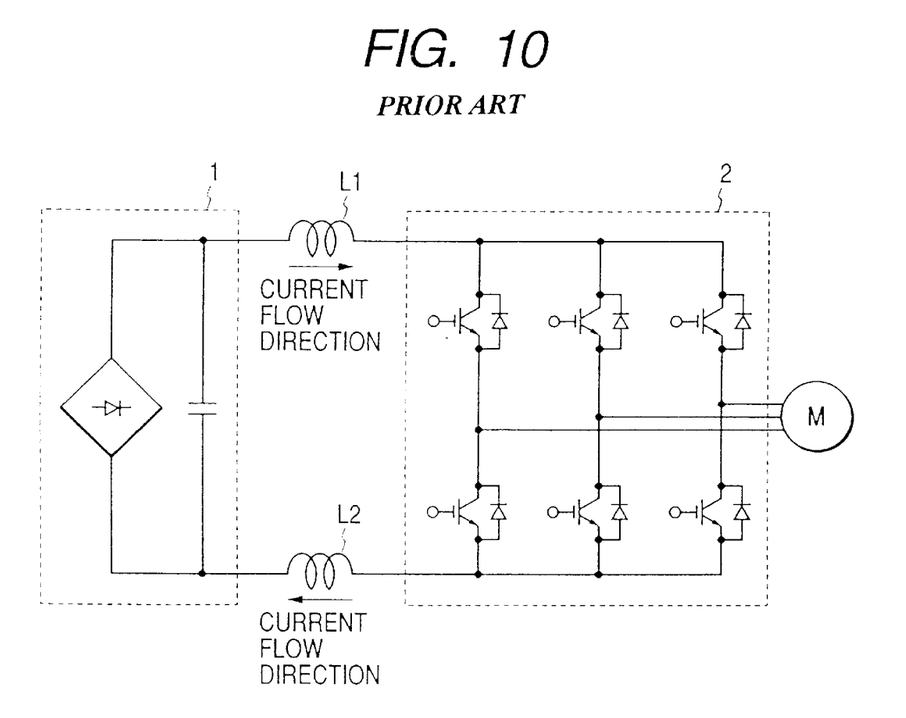

For example, JP-A-7-203686(1995) discloses one of such technical measures for reducing the inductances of the above mentioned power distribution buses, which is called herein below the first conventional approach, in which each of two power distribution buses, through which currents flow in opposite directions comprises a conductor plate having a wide width. The two conductor plates are positioned closely. The first conventional approach will be explained with reference to FIG. 10. In the circuit diagram of FIG. 10, a DC power source unit 1 and a three phase inverter unit 2 are connected via two power distribution buses including a positive polarity side and a negative polarity side. Since currents in opposite directions always flow through these two power distribution buses, two opposing magnetic fluxes caused by the respective currents are canceled out by positioning these two power distribution buses closely. Thereby inductances $L_1$ and $L_2$ of the respective power distribution buses are reduced.

Further, JP-A-7-131981(1995) discloses another technical measure for reducing the inductances of the power distribution buses, referred to herein below as second conventional approach, in which collective power distribution bus bars formed by laminating a plurality of conductor plates are used while interposing an insulating material therebetween. With this second technical measure the inductances of the power distribution buses are also reduced, and further, through the use of the collective power distribution bus bars, the steps for assembling the power inverter device are reduced.

Figure 4:
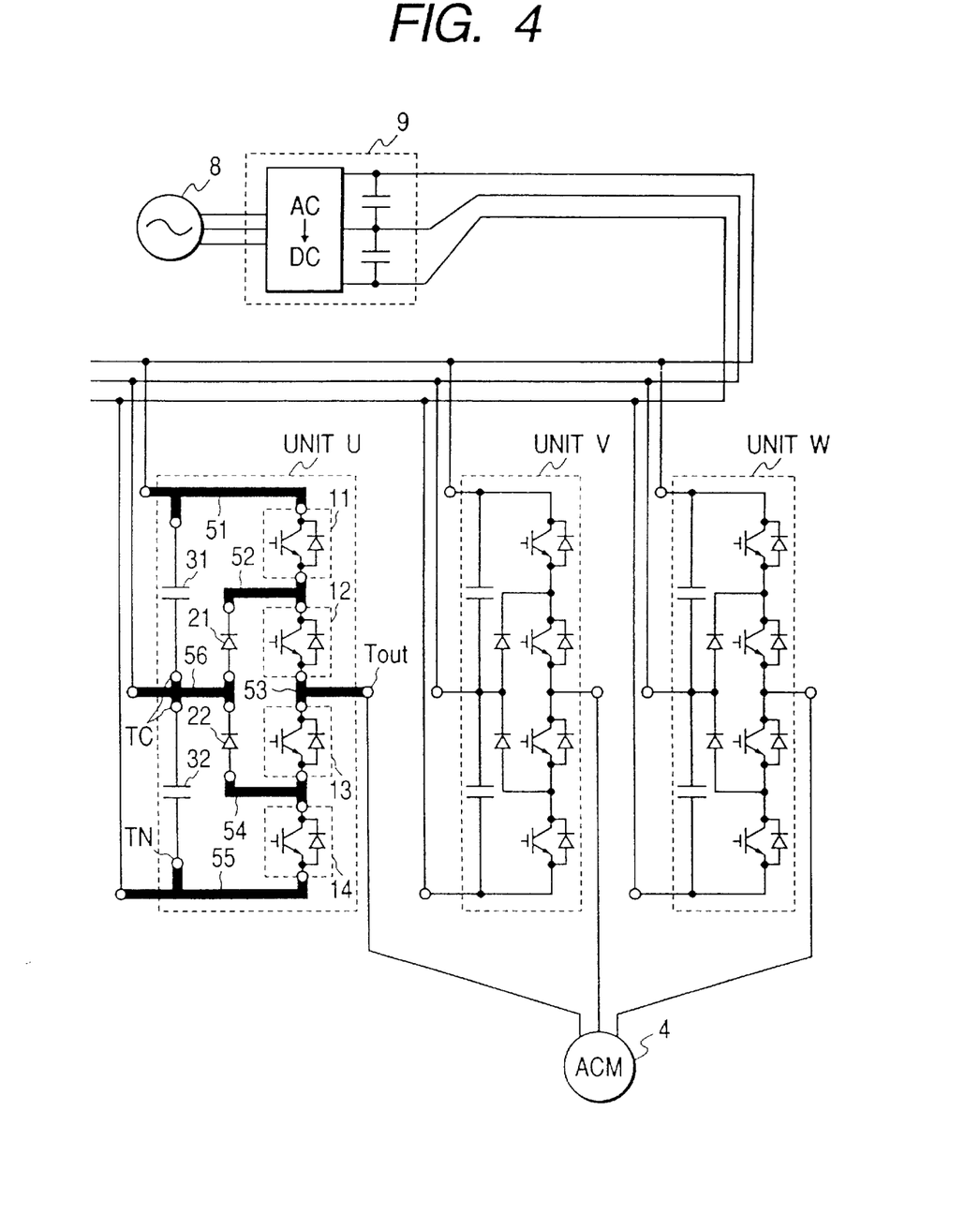
FIG. 4 is a circuit diagram of a three phase AC motor driving device which includes by the power inverter device shown in FIG. 1.

In a power inverter device of a comparatively large capacity, the size of the device is enlarged and the inductances of the power distribution buses are increased. Therefore, a DC capacitor bank for smoothing use is generally provided for each of the phases of the power inverter device. For example, a circuit for a neutral point clamped 3 level inverter is constructed as illustrated in FIG. 4. The inverter in FIG. 4 is provided with smoothing use DC capacitor banks 31 and 32 in respective units U, V, and W thereof. When the inverter is provided with these smoothing use capacitor banks for respective phases, the magnitude of a surge voltage induced during the switching of the switching elements therein is determined by the magnitude of inductances between the smoothing use capacitor banks and the switching elements in the inverter. Thereby, generation of a high voltage surge affected by DC buses having large inductances is prevented.

However, when using fast switching elements such as IGBTs as the semiconductor switching elements, the variation rate of commutation current is also large, therefore it is required to reduce inductances of power distribution buses even within the inverter as much as possible. However, when applying the above mentioned conventional technical measures to the power inverter device using the neutral point clamped 3 level inverter as illustrated in FIG. 4, the following problems arise.

In the neutral point clamped 3 level inverter, six power distribution bus bars 51 through 56 are used. When applying the first technical measure, it is necessary to place the two power distribution bus bars through which currents in opposite directions always flow close to each other. However, the currents flowing through the power distribution bus bars vary depending on differences of on and off conditions of the switching elements and the direction of load current in the neutral point clamped 3 level inverter, and no combination of two power distribution bus bars through which currents in opposite directions always flow exists. Therefore, even if certain two power distribution bus bars are placed close, no effect of reducing the inductances can be obtained with some of the inverter operations and the surge voltage can not be suppressed.

On one hand, through application of the second technical measure it is possible to prepare conductor plates having wide width and same size for the power distribution bus bars and to place six of the prepared conductor plates close via respective insulating materials. In this instance, reduction of the inductances of the power distribution bus bars can be achieved. However, for the neutral point clamped 3 level inverter the conductor plates necessary for the power distribution have to be laminated in six layers which causes a problem of in the complexity of the structure. For example, when connecting a terminal of an electrical part to a certain power distribution bus bar, it is necessary to form respective escape holes for the remaining five power distribution bus bars so as to prevent an electrical contact with the connecting portion. Therefore, a problem of increasing the manufacturing cost arises. Other than the above problem because of the necessity of six conductor plates of the same size, the weight of the power distribution bus bars necessary for the power distribution increases which causes a problem of mechanical unstability of the device.

SUMMARY OF THE INVENTION

An object of the present invention is to provide a power inverter device which can reduce a surge voltage in all of its operating conditions and has a simple structure.

A power inverter device formed by connecting a plurality of semiconductor switching elements, diodes and capacitors via plate shaped conductors according to a first invention feature of the invention which achieves the above object, is characterized in that, the plate shaped conductors include one through which no current flows before and after any of the semiconductor switching elements performs switching, over a first plate shaped conductor through which a current flows either before or after switching of all of the semiconductor switching elements the other remaining plate shaped conductors are arranged via an insulating material.

Since the current flows through the first plate shaped conductor either before or after the switching of all of the semiconductor switching elements, when any of the semiconductor switching elements performs switching, current flowing through the first plate shaped conductor either increases or decreases. On the other hand, at any of the other plate shaped conductors through the switching of the semiconductor switching elements the current either decreases or increases in the opposite direction with respect to the current variation at the first plate shaped conductor. Since the other plate shaped conductors are arranged over such first plate shaped conductor, the increasing current and the decreasing current can come close during the switching of the semiconductor switching elements. Thereby, the magnetic flux variation caused by the current variation is canceled out and the magnetic flux before and after switching can be kept constant. Accordingly, the surge voltage induced during the switching of the semiconductor switching elements can be reduced.

A neutral point clamped 3 level type power inverter device according to a second feature of the invention which achieves the above object comprises first through fourth semiconductor switching elements. A first plate shaped conductor connects the first semiconductor switching element and the second semiconductor switching element in series. A second plate shaped conductor having an AC terminal connects the second semiconductor switching element and the third semiconductor switching element in series. A third plate shaped conductor connects the third semiconductor switching element and the fourth semiconductor switching element in series. A capacitor having an intermediate voltage point is connected in parallel with the series connected first through fourth semiconductor switching elements via fourth and fifth plate shaped conductors. A first diode one terminal of which is connected to the intermediate voltage point of the capacitor via a sixth plate shaped conductor and the other terminal of is connected to the first plate shaped conductor with a polarity in the direction of a forward current from the intermediate voltage point of the capacitor to the first plate shaped conductor. A second diode has one terminal of which is connected to the sixth plate shaped conductor and the other terminal of which is connected to the third plate shaped conductor with a polarity in the direction a forward current from the third plate shaped conductor to the intermediate voltage point of the capacitor. In accordance with this feature of the invention the first through fifth plate shaped conductors are arranged over the sixth plate shaped conductor via an insulating material.

Since current flows through the sixth plate shaped conductor either before or after switching of all of the semiconductor switching elements, when any of the semiconductor switching elements performs switching, current flowing through the sixth plate shaped conductor either increases or decreases. On the other hand, at any of the first through fifth plate shaped conductors through the switching of the semiconductor switching elements the current either decreases or increases in the opposite direction with respect to the current variation at the sixth plate shaped conductor. Since the first through fifth plate shaped conductors are arranged over such sixth plate shaped conductor, the increasing current and the decreasing current can come close during the switching of the semiconductor switching elements. Thereby, the magnetic flux variation caused by the current variation is canceled out each other and the magnetic fluxes before and after switching can be kept constant. Accordingly, the surge voltage induced during the switching of the semiconductor switching elements can be reduced.

In accordance with a third feature of the invention which achieves the above object, the first through fifth plate shaped conductors are arranged on a common plane.

Through the arrangement of the other plate shaped conductors on the common plane, the power distribution in the power inverter device can be formed in two layers of the sixth plate shaped conductor and the first through fifth plate shaped conductors which improves the mechanical stability of the device.

In accordance with a fourth feature of the invention which achieves the above object, the insulating material is an air layer. Through the use of the air layer as the insulating material, mere arrangement of the sixth plate shaped conductor and the first through fifth plate shaped conductors with a space for insulation therebetween can be achieved which simplifies the structure of the power inverter device.

In accordance with a fifth feature of the invention which achieves the above object, the semiconductor switching element at the highest voltage side and the semiconductor switching element at the lowest voltage side among the plurality of the semiconductor switching elements are arranged close to the capacitor.

Through the arrangement of the semiconductor switching element at the highest voltage side and the semiconductor switching element at the lowest voltage side close to the capacitor, the length of the plate shaped conductor connecting the semiconductor switching element at the highest voltage side, the semiconductor switching element at the lowest voltage side and the capacitor is shortened. Thereby, a surge voltage induced by variation of the current flowing through the plate shaped conductor is reduced.

In accordance with a sixth feature of the invention which achieves the above object, the first plate shaped conductor is provided with a connection point for the first diode between a connection point of the first semiconductor switching element and a connection point of the second semiconductor switching element.

Through the provision of the connection point for the first diode between the connection point of the first semiconductor switching element and the connection point of the second semiconductor switching element, a path of current which varies during the switching of the first semiconductor switching element is restricted between the first semiconductor switching element and the first diode. Thereby, the surge voltage is reduced.

In accordance with a seventh feature of the invention which achieves the above object, the third plate shaped conductor is provided with a connection point for the second diode between a connection point of the third semiconductor switching element and a connection point of the fourth semiconductor switching element.

Through the provision of the connection point for the second diode between the connection point of the third semiconductor switching element and the connection point of the fourth semiconductor switching element, a path of current which varies during the switching of the fourth semiconductor switching element is restricted between the fourth semiconductor switching element and the second diode. Thereby, the surge voltage is reduced.

DETAILED DESCRIPTION

An embodiment of the present invention will be explained in detail with reference to the drawings.

Figure 1:
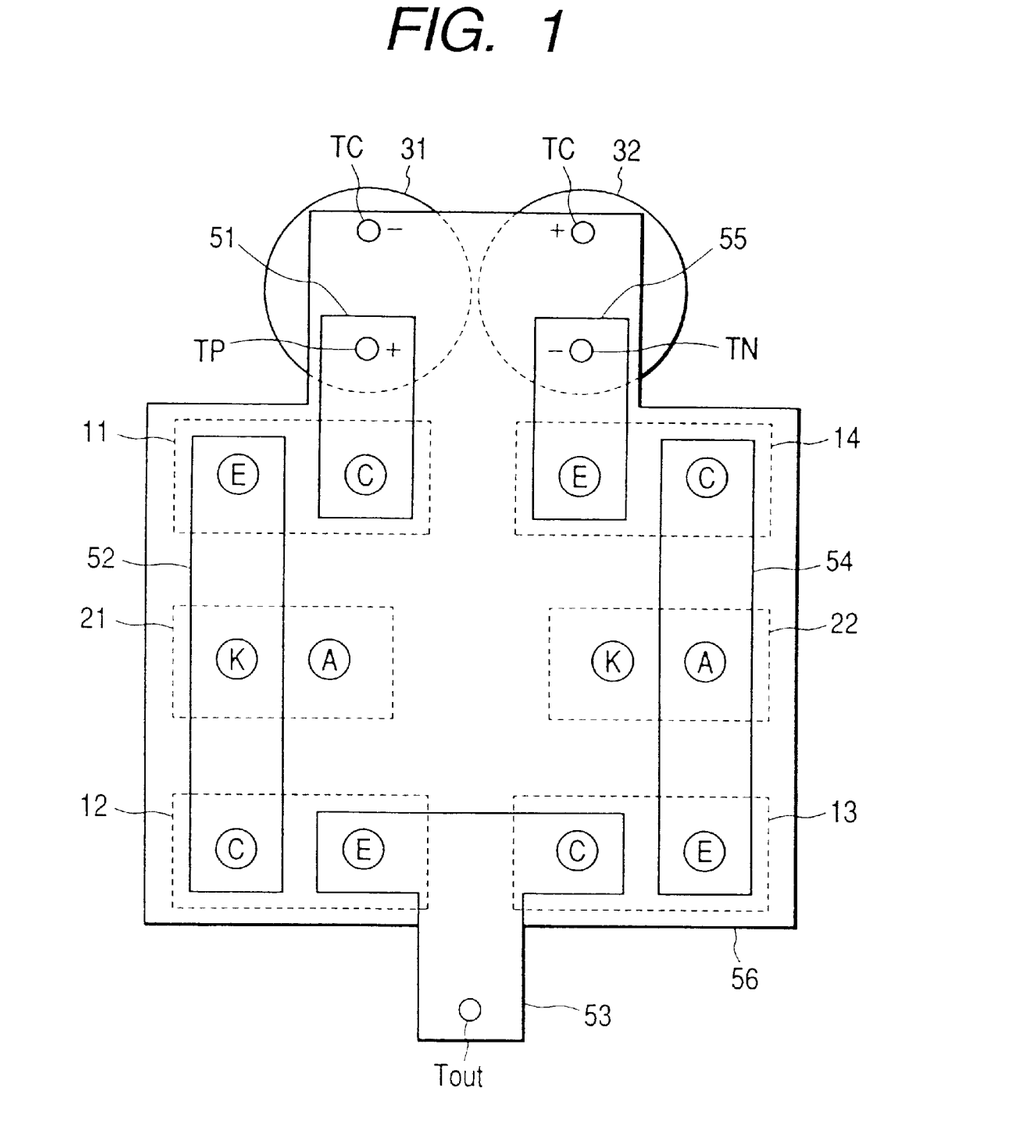
FIG. 1 is a plan view of a power inverter device representing one embodiment according to the present invention.

FIG. 1 is a plan view of a power inverter device representing one embodiment according to the present invention. Further, the power inverter device according to the present embodiment is a neutral point clamped 3 level inverter.

In the power inverter device according to the present embodiment, over semiconductor switching elements in modules 11 through 14, diodes 21 and 22 and smoothing use capacitors 31 and 32, a plate shaped conductor 56 is arranged, and further, over the plate shaped conductor 56, plate shaped conductors 51 through 55 are arranged to from the device. Further, each of the semiconductor switching elements 11 through 14 includes a semiconductor switch and a diode connected in antiparallel. Each of the semiconductor switching elements 11 through 14 has a positive side terminal C and a negative side terminal E as illustrated in FIG. 1. Further, each of the semiconductor switching elements 11 through 14 also includes a control terminal (not shown) and the turn on and turn off thereof are controlled by a control circuit. In the explanation of the present embodiment hereinbelow, the semiconductor switching element, the smoothing use capacitor and the plate shaped conductor are respectively called the switching element, the capacitor and the conductor.

In FIG. 1, the positive side terminal C of the switching element 11 is connected to the positive terminal of the capacitor 31 via the conductor 51. Further, the negative side terminal E of the switching element 11 is connected to the cathode terminal K of the diode 21 and to the positive terminal C of the switching element 12 via the conductor 52. The negative terminal E of the switching element 12 is connected to the positive terminal C of the switching element 13 via the conductor 53. At the conductor 53 an AC terminal $T_{out}$ of the power inverter device is provided to which a load is to be connected. The negative terminal E of the switching element 13 is connected to the anode terminal A of the diode 22 and to the positive terminal C of the switching element 14 via the conductor 54. The negative terminal of the switching element 14 is connected to the negative terminal of the capacitor 32 via the conductor 55. Further, the anode terminal A of the diode 21, the cathode terminal K of the diode 22, the negative terminal of the capacitor 31 and the positive terminal of the capacitor 32 are connected via the conductor 56.

As will be apparent from the above, the four switching elements 11 through 14 are connected in series. The switching element 11 at the most high voltage side and the switching element 14 at the most low voltage side among the switching elements are placed close to the capacitors 31 and 32. Further, the conductors 51 and 55 are arranged side by side. Still further, the surface area of the conductor 56 is large in comparison with those of the conductors 51 through 55 and the conductors 51 through 55 are arranged over the conductor 56 via a layer of air for the purpose of insulation from the conductor 56.

Figure 2:
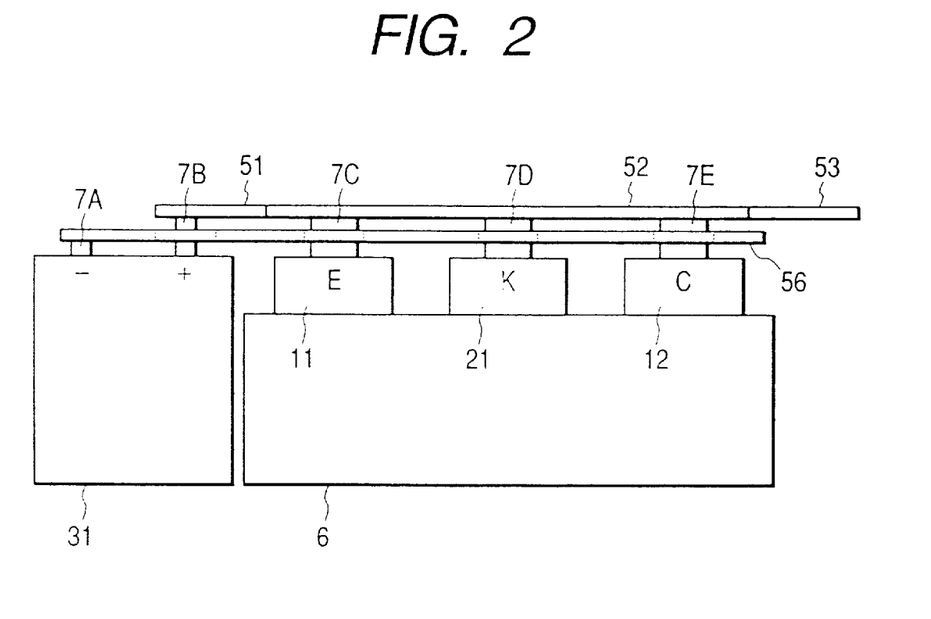
FIG. 2 is a side view of the power inverter device shown in FIG. 1.

FIG. 2 is a side view of the power inverter device shown in FIG. 1.

In FIG. 2, a cooling device 6 such as a heat sink cools the switching elements 11 through 14 and the diodes 21 and 22 to prevent an overheating of the switching elements 11 through 14 and the diodes 21 and 22. The switching elements 11 and 12 and the diode 21 are connected to the conductors 51 through 53 by making use of spacers 7C through 7E serving as cylindrical shaped conductors. The capacitor 31 is likewise connected to the conductors 51 and 56 via spacers 7A and 7B. Further, the spacers 7B through 7E pass through holes, diameters of which are larger than that of the spacers 7B through 7E, being provided at the conductor 56 so as to prevent contacting to the same, and the positive side terminals of the switching elements 11 and 12, the diode 21 and the capacitor 31 are isolated from the conductor 56. Further, the switching elements 13 and 14, the diode 22 and the capacitor 32 are also connected to the respective conductors by making use of spacers. Although not illustrated in the drawing, fixing of the terminals of the respective switching elements and the conductors with the spacers is performed via bolts or screws. As illustrated in FIG. 2, a substantially constant gap is kept between the conductor 56 and the conductors 51 through 55 by means of the spacers 7A through 7E, and the air layer serving as an insulating layer is formed therebetween as explained previously. Alternatively, a plate shaped solid insulating material can be inserted between the conductors 51 through 55 and the conductor 56 to thereby integrate the plurality of power distribution conductors and the insulating material.

Figure 3:
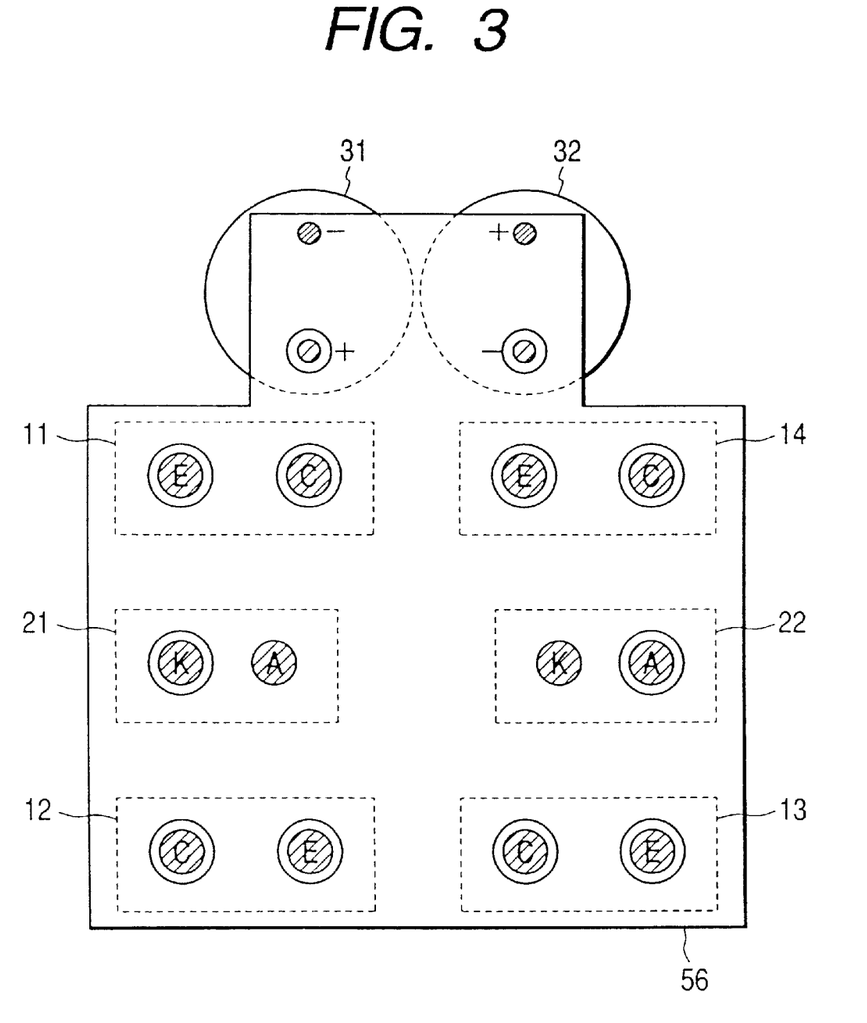
FIG. 3 is a diagram showing a connecting relation between semiconductor switching elements 11 through 14, diodes 21 and 22, smoothing use capacitors 31 and 32 and a plate shaped conductor 56 in FIG. 1.

FIG. 3 is a diagram showing a connecting relation between semiconductor switching elements 11 through 14, diodes 21 and 22, smoothing use capacitors 31 and 32 and plate shaped conductor 56 in FIG. 1. As explained previously, the anode terminal A of the diode 21, the cathode terminal K of the diode 22, the negative terminal of the capacitor 31 and the positive terminal of the capacitor 32 are connected via the conductor 56. For the other terminals the spacers pass through the holes provided at the conductor 56 without touching the conductor 56 so as to be isolated therefrom as illustrated in the drawing.

FIG. 4 is a circuit diagram of a three phase AC motor driving device which includes the power inverter device shown in FIG. 1. A converter 9 converts an AC power supplied from an AC power source 8 into a DC power. The voltage of the DC power outputted from the converter 9 is divided by capacitors to form 3 level DC voltages. The 3 level DC voltages output from the converter 9 are introduced via three DC buses to the conductors 51, 55 and 56 of the respective power inverter devices for phases U, V and W. Further, the AC terminals the respective power inverter devices are connected to a load 4.

Now, the principle of how the inductances of the power distribution bus bars are reduced and how the surge voltage induced during switching of the switching elements is reduced with the structure of the power inverter device according to the present embodiment will be explained.

Figure 5A:
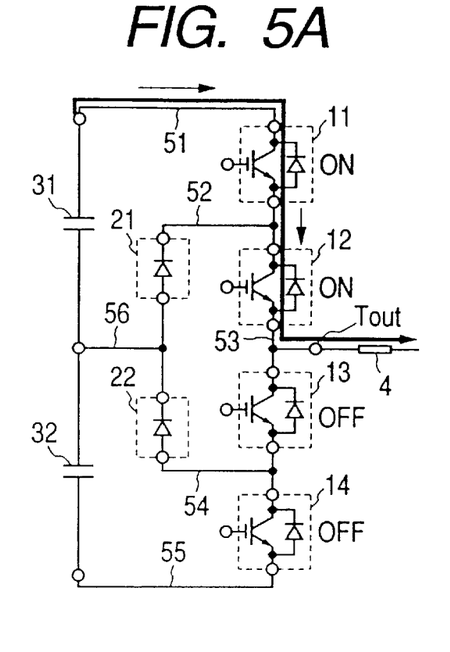
FIGS. 5A, 5B and 5C are diagrams showing three current paths in a neutral point clamped 3 level inverter circuit.
Figure 5B:
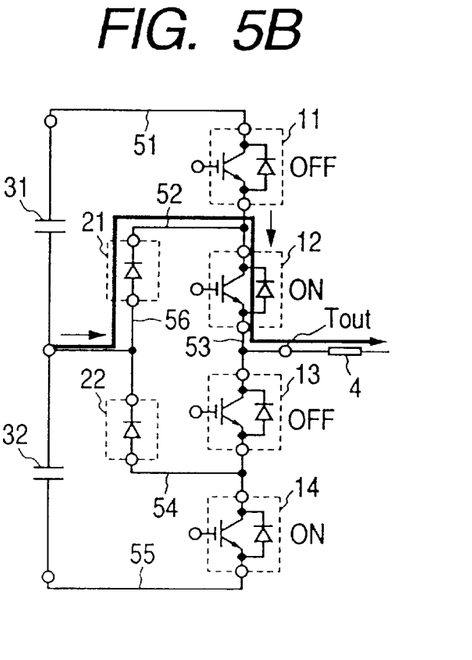
Figure 5C:
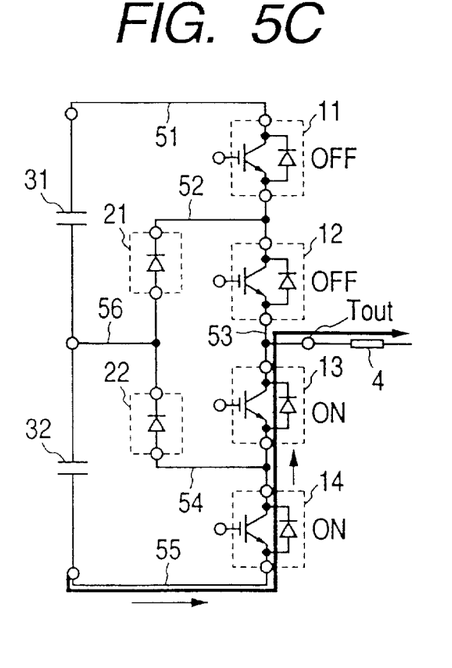
Figure 6A:
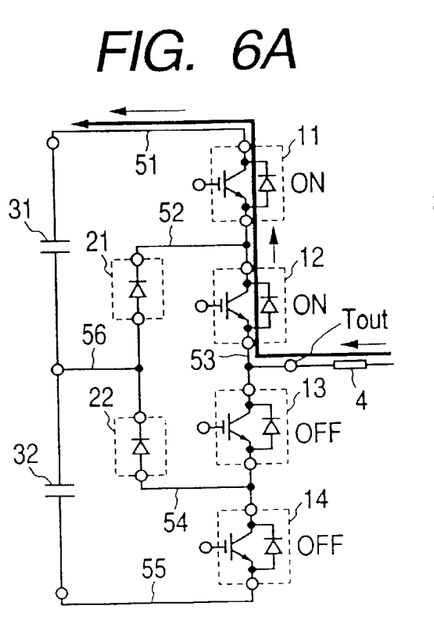
FIGS. 6A, 6B and 6C are diagrams showing three other current paths in the neutral point clamped 3 level inverter circuit.
Figure 6B:
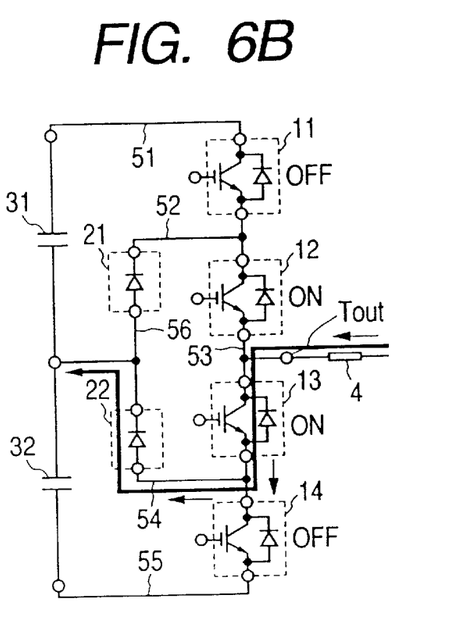
Figure 6C:
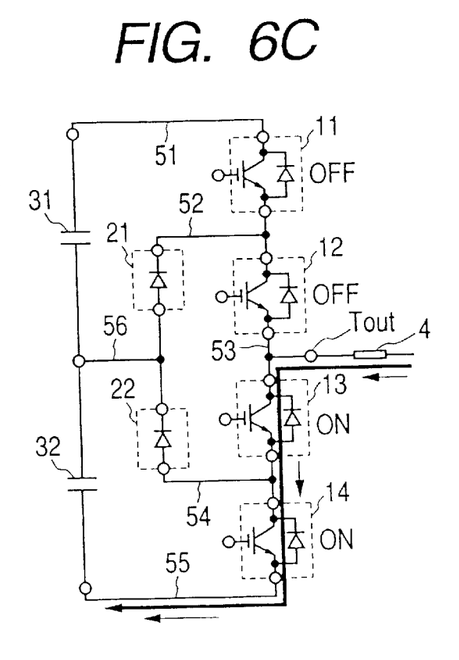

FIGS. 5A through 5C and FIGS. 6A through 6C show all of the current paths in the neutral point clamped 3 level inverter circuit representing the power inverter device according to the present embodiment. The current paths vary depending on the direction of current and the on and off condition of the switching elements. FIGS. 5A through 5C show instances when the currents flow from the AC terminal $T_{out}$ toward the load 4. On the other hand, FIGS. 6A through 6C show instances when the currents flow from the load 4 toward the AC terminal $T_{out}$.

FIG. 5A shows the current path when the switching elements 11 and 12 are on and the switching elements 13 and 14 are off, in which the current flows in the order of the conductor 51, the switching element 11, the conductor 52, the switching element 12 and the conductor 53. When the condition shown in FIG. 5A changes to a condition where the switching element 11 is off and the switching element 13 is on, the current path changes to that shown in FIG. 5B. In this instance, the current flows in the order of the conductor 56, the diode 21, the conductor 52, the switching element 12 and the conductor 53. Further, the change from the current path shown in FIG. 5A to the current path shown in FIG. 5B implies that the current flowing through the conductor 51 and the switching element 11 decreases and the current flowing through the conductor 56 and the diode 21 increases. Further, when the condition shown in FIG. 5B changes to a condition wherein the switching element 12 is off and the switching element 14 is on, the current path changes to that shown in FIG. 5C. In this instance, the current flows in the order of the conductor 55, the switching element 14, the conductor 54, the switching element 13 and the conductor 53. Further, the change from the current path shown in FIG. 5B to the current path shown in FIG. 5C implies that the current flowing through the conductor 56, the diode 21, the conductor 52 and the switching element 12 decreases and the current flowing through the conductor 55, the switching element 14, the conductor 54 and the switching element 13 increases.

FIG. 6A shows the current path when the switching elements 11 and 12 are on and the switching elements 13 and 14 are off, in which the current flows in the order of the conductor 53, the switching element 12, the conductor 52, the switching element 11 and the conductor 51. When the condition shown in FIG. 6A changes to a condition where the switching element 11 is off and the switching element 13 is on, the current path changes to that shown in FIG. 6B. In this instance, the current flows in the order of the conductor 53, the switching element 13, the conductor 54, the diode 22 and the conductor 56. Further, the change from the current path shown in FIG. 6A to the current path shown in FIG. 6B implies that the current flowing through the switching element 12, the conductor 52, the switching element 11 and the conductor 51 decreases and the current flowing through the switching element 13, the conductor 54, the diode 22 and the conductor 56 increases. Further, when the condition shown in FIG. 6B changes to a condition wherein the switching element 12 is off and the switching element 14 is on, the current path changes to that shown in FIG. 6C. In this instance, the current flows in the order of the conductor 53, the switching element 13, the conductor 54, the switching element 14 and the conductor 55. Further, the change from the current path shown in FIG. 6B to the current path shown in FIG. 6C implies that the current flowing through the diode 22 and the conductor 56 decreases and the current flowing through the switching element 14 and the conductor 55 increases.

Now, when two currents flowing in the same direction come close each other, and one of them increases and the other decreases, the inductance of the power distribution bus bars is decreased and an advantage of suppressing the surge voltage is achieved, which will be explained hereinbelow with reference to the following arithmetic formulas. When two currents $i_1$ and $i_2$ are flowing in parallel in the same direction, the number of cross linkage of the magnetic fluxes induced around the current $i_1$ is expressed by the arithmetic formula (1) as follows:

$$\phi = L_1 i_1 + M_{12} i_2 \qquad (1)$$

Where, $L_1$ is self inductance of the path of the current $i_1$, and $M_{12}$ is mutual inductance between the path of current $i_1$ and the path of the current $i_2$. When assuming the positive current directions of both currents $i_1$ and $i_2$ are the same, the mutual inductance $M_{12}$ takes a positive value. When the number of cross linked magnetic fluxes varies, an electromotive force $\Delta V$ is induced which is expressed by the following arithmetic formula (2):

$$\Delta V = -\frac{d\phi}{dt} = -L_1 \frac{di_1}{dt} - M_{12} \frac{di_2}{dt} \qquad (2)$$

From the above arithmetic formula (2), it will be understood that when the currents vary, an electromotive force $\Delta V$ is induced in the circuit of $L_1$. The surge voltage induced by switching the switching elements is caused by the very electromotive force $\Delta V$. Now, assuming that the currents vary as expressed by the following arithmetic formula (3):

$$\frac{di_1}{dt} = -\frac{di_2}{dt} \qquad (3)$$

Namely, a case is assumed that one of the currents $i_1$ and $i_2$ increases, and the other decreases. In this instance, the electromotive force $\Delta V$ is expressed by the following arithmetic formula (4):

$$\Delta V = -(L_1 - M_{12}) \frac{di_1}{dt} \qquad (4)$$

Since the mutual inductance $M_{12}$ is positive as defined above, the difference between $L_1$ and $M_{12}$ is small in comparison with the self inductance $L_1$. Namely, the electromotive force $\Delta V$ expressed by the arithmetic formula (4) becomes small in comparison with a case wherein the current $i_1$ varies independently. Further, when the two current paths come close each other, the values of $L_1$ and $M_{12}$ also come close, thereby the electromotive force $\Delta V$ can be further reduced.

As explained previously, in the present embodiment, when any of the switching elements performs switching, the current flowing through the conductor 56 either increases or decreases. Further, when the switching of the switching elements is performed, any of the currents flowing through the conductors 51 through 55 either decreases or increases in an opposite manner to the variation of the current flowing through the conductor 56. Thereby, through the arrangement of the conductors 51 through 55 closely over the conductor 56 according to the present embodiment, the increasing current and the decreasing current can be placed close. As a result, the inductances of the conductors are reduced and the surge voltage is suppressed, which hereinbelow will be explained in detail with reference to the drawings.

Figure 7A:
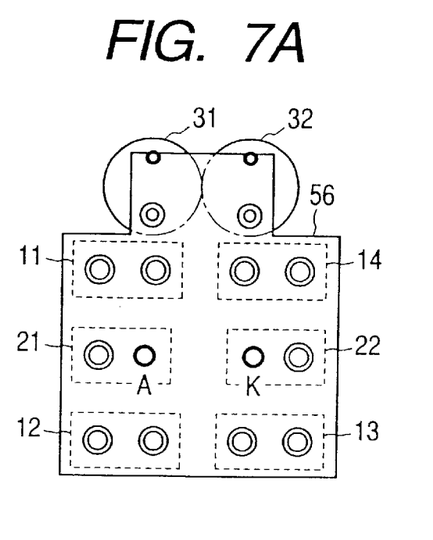
FIGS. 7A, 7B, 7C and 7D are diagrams showing current paths in the power inverter device in FIG. 1.
Figure 7B:
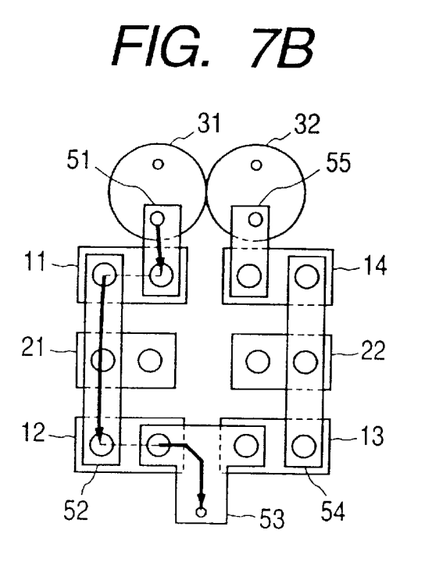
Figure 7C:
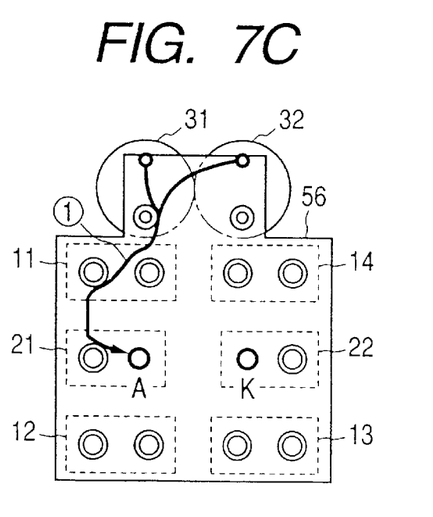
Figure 7D:
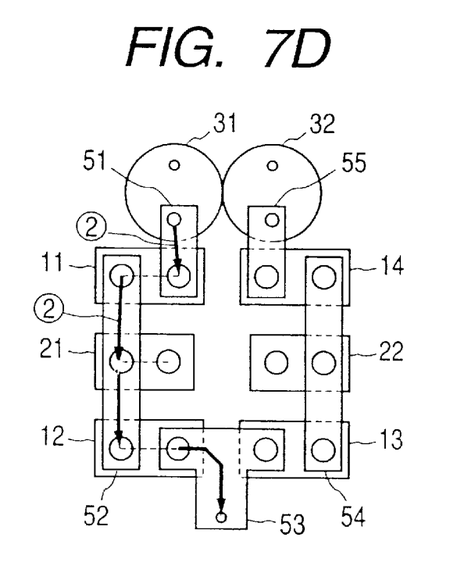

FIGS. 7A and 7B show current paths in the power inverter device shown in FIG. 1 corresponding to the condition of FIG. 5A, and FIGS. 7C and 7D show transient current path variation in the power inverter device shown in FIG. 1, when the current path varies from that shown in FIG. 5A to that shown in FIG. 5B. Further, FIGS. 7A and 7C illustrate the current paths in the conductor 56 and FIGS. 7B and 7D illustrates the current paths in the conductors 51 through 55.

As explained previously, in the condition shown in FIG. 5A, the current flows from the capacitor 31 to the AC terminal $T_{out}$ through the conductor 51, the switching element 11, the conductor 52, the switching element 12 and the conductor 53 in this order. Accordingly, no current flows through the conductor 56 as illustrated in FIG. 7A, and the current flows through the conductors 51 through 53 in the arrowed direction as illustrated in FIG. 7B.

When the current path varies from that of FIG. 5A to that of FIG. 5B through switching of the switching elements, the current flowing through the conductor 51 and the switching element 11 decreases and the current flowing through the conductor 56 and diode 21 increases. Namely, the current (1) in FIG. 7C increases and the current (2) in FIG. 7D decreases. Further, the reason why the current path through the conductor 56 takes that of (1) is that due to the decrease of the current (2) in FIG. 7D an electromagnetic induction is effected on a portion of the conductor 56 immediately below the current (2), namely the portion corresponding to the current (1), and the current is concentrated at the portion of the current (1). Through the electromagnetic induction action the current is concentrated so as to maintain the surrounding magnetic fluxes constant. Further, this current concentration is transient one, and when a predetermined time has passed after switching the switching elements the current flows while spreading over the entire width of the conductor 56.

As explained above, in the present embodiment, the increasing current (1) and the decreasing current (2) can be placed close. The flow directions of both currents are the same, therefore, the current variation rates satisfy the condition expressed by the arithmetic formula (3). Further, the inductances of the both current paths (1) and (2) become substantially equal. Accordingly, the surge voltage, which is induced when the current path changes to that of FIG. 5A to that of FIG. 5B through switching of the switching elements, is suppressed to a low value.

Further, through substantially the same action as when the current path changes from that of FIG. 5A to that of FIG. 5B, the surge voltage, which is induced when the current path changes from that of FIG. 6C to that of FIG. 6B, is suppressed to a low value.

Further, in order to suppress both the surge voltage induced when switching the switching element 11 and the surge voltage induced when switching the switching element 14, in the present embodiment the switching element 11 at the highest voltage side and the switching element 14 at the lowest voltage side among the switching elements 11 through 14 are arranged near the capacitors 31 and 32. By this measure, the surge voltages induced by the switching of the switching elements 11 and 14 can be suppressed. Further, through the arrangement of the switching element 11 at the highest voltage side and the switching element 14 at the most low voltage side near the capacitors 31 and 32, the lengths of the conductors 51 and 55 are shortened which also contributes to reduce the surge voltage.

In the present embodiment, at the conductor 52 between the negative terminal E of the switching element 11 and the positive terminal C of the switching element 12 the cathode terminal K of the diode 21 is connected. With this structure, even when the switching element 11 performs switching, the current between the diode 21 and the switching element 12 can be kept constant and the portion on the conductor 52 where the current varies is limited that between the switching element 11 and the diode 21. By means of shortening the portion where the current varies an increasing of the surge voltage is prevented. Further, the shorter the power distribution length between the negative terminal E of the switching element 11 and the cathode terminal K of the diode 21 is, the less the portion where the current varies due to the switching of the switching element 11 becomes. Thereby the surge voltage is further suppressed low. In the like manner, since the above terminal A of the diode 22 is connected to the center portion of the conductor 54 in the present embodiment, an increasing of the surge voltage due to the switching element 14 is prevented. Alternatively, if the negative terminal E of the switching element 11 is connected to the center of the conductor 52, and the cathode terminal K of the diode 21 and the positive terminal C of the switching element 12 are connected respective ends of the conductor 52, the surge voltage is likely suppressed. Further alternatively, by changing the location of the respective elements at the conductor 54, and if the positive terminal C of the switching element 14 is connected to the center portion of the conductor 54 and the anode A of the diode 22 and the negative terminal E of the switching element 13 are connected to the respective ends of the conductor 54, the surge voltage can also be suppressed.

Figure 8A:
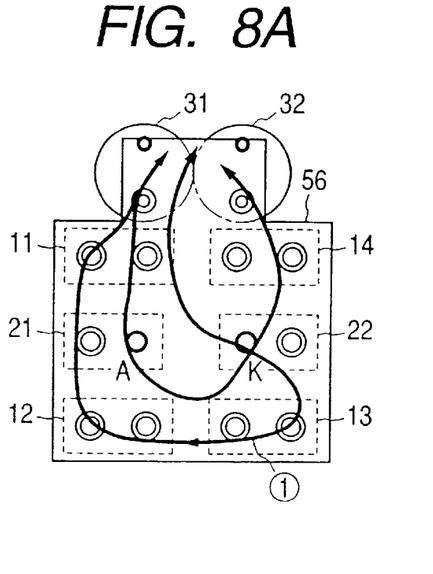
FIGS. 8A, 8B, 8C and 8D are diagrams showing other current paths in the power inverter device in FIG. 1.
Figure 8B:
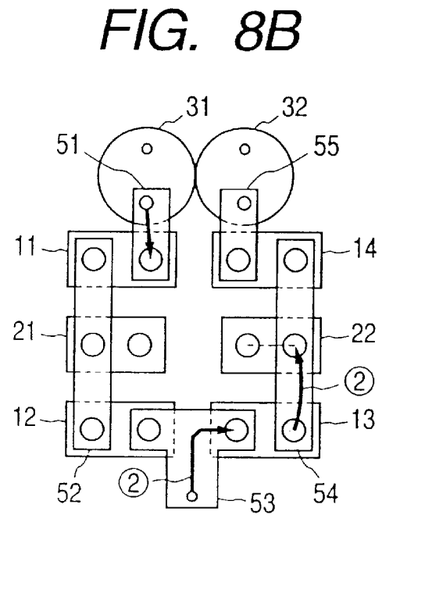
Figure 8C:
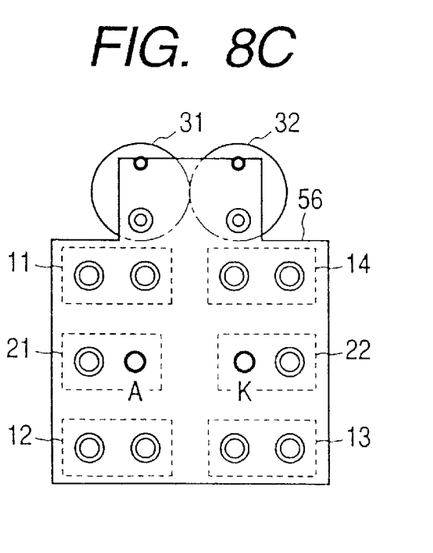
Figure 8D:
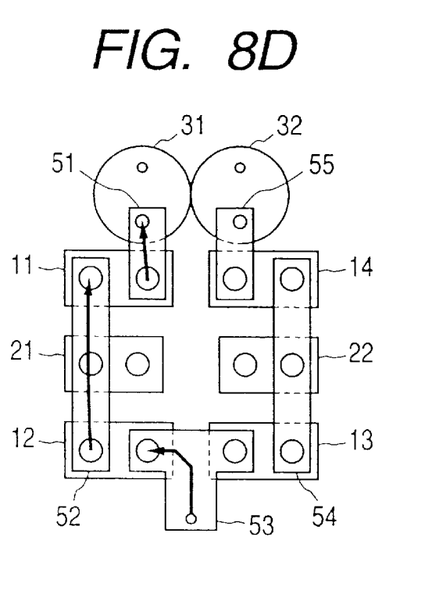

FIGS. 8A and 8B show current paths in the power inverter device shown in FIG. 1 corresponding to the condition of FIG. 6B, and FIGS. 8C and 8D show current paths in the power inverter device shown in FIG. 1 corresponding to the condition of FIG. 6A. Further, FIGS. 8A and 8C illustrate the current paths in the conductor 56 and FIGS. 8B and 8D illustrate the current paths in the conductors 51 through 55.

As explained previously, in the condition shown in FIG. 6B, the current flows from the AC terminal $T_{out}$ to the capacitors 31 and 32 through the conductor 53, the switching element 13, the conductor 54, the diode 22 and the conductor 56 in this order. Accordingly, the current flows from the cathode terminal K of the diode 22 to the capacitors 31 and 32 in the arrowed direction through the entire surface of the conductor 56 as illustrated in FIG. 8A, and the current flows through the conductors 53 and 54 in the arrowed direction as illustrated in FIG. 8A.

Figure 9A:
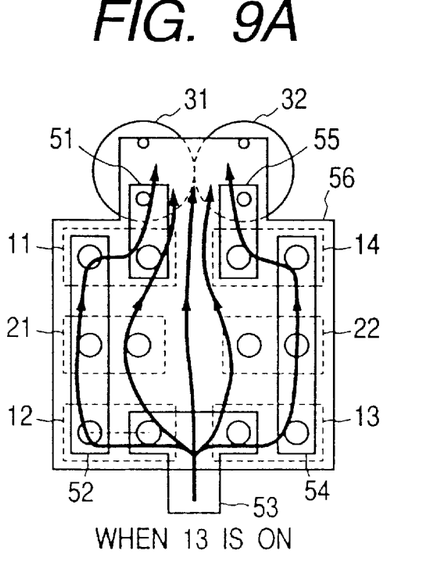
FIGS. 9A, 9B and 9C are diagrams showing effective current paths of the current paths shown in FIGS. 8A, 8B and 8C; and, FIG. 10 is a circuit diagram of a conventional power inverter device.

In FIGS. 8A and 8B, immediately below the current (2) flowing through the conductors 53 and 54 the current (1) in opposite direction flows through the conductor 56. When summing the currents in the portions flowing close, and considering the current flows as a whole, the manner of current flows is represented as illustrated in FIG. 9A. On the other hand, in FIG. 8C no current flows through the conductor 56 and in FIG. 8D the current flows through the conductor 51, the conductor 52 and the conductor 53 in the arrowed direction. Accordingly, in this instance the current flow viewed as a whole is concentrated in the conductors 51, 52 and 53 as illustrated in FIG. 9B.

Figure 9B:
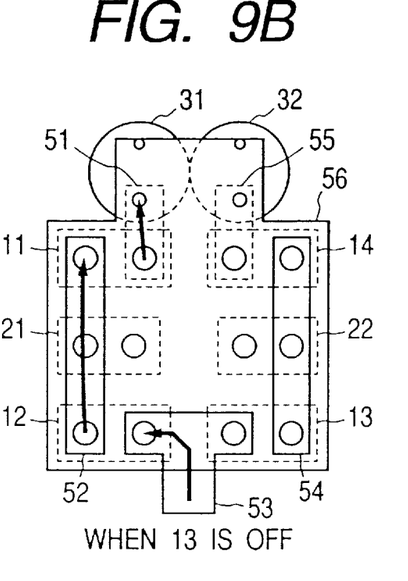

Namely, when the transient variation of the current caused by turning off the switching element 13, among the currents flowing while spreading over the entire surface of the conductors as illustrated in FIG. 9A, the current flowing at the side of the conductor 54 decreases and the current flowing at the side of the conductor 52 increases, and finally the current only flows through the conductors 51 through 53 as illustrated in FIG. 9B. When the current either increases or decreases as explained above, magnetic fluxes also either increases or decreases in association with the current variation, however, a current flows through the conductor 56 due to the electromagnetic induction action in the direction of canceling out the increasing or decreasing of the magnetic fluxes. Namely, at the side of the conductor 54 because of decreasing of the current flowing from the switching element 13 to the switching element 14 the magnetic fluxes also deceases, however, by means of the electromotive force induced by the electromagnetic induction action a current in a direction which cancels out the decreasing of the magnetic fluxes, namely the current from the switching element 13 to the switching element 14 flows through the conductor 56.

Figure 9C:
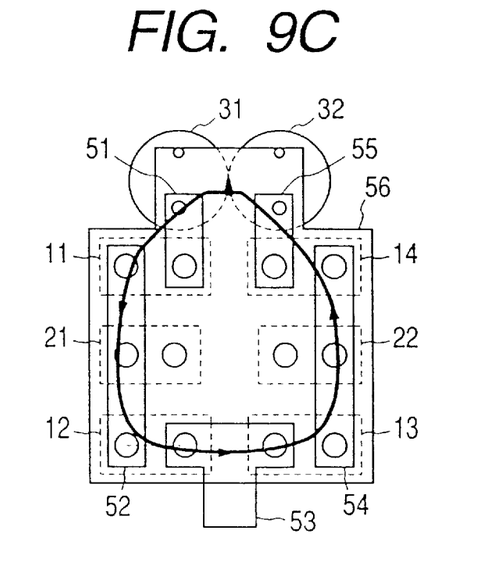

The current thus caused in the conductor 56 forms an eddy current circulating along the conductor 56 in the arrowed direction as illustrated in FIG. 9C. Because the magnetic fluxes increase at the side of the conductor 52 due to this eddy current, an electromotive force is induced which causes a current in the direction of canceling out the increase of the magnetic fluxes. Namely, an electromotive force is induced which causes a current flowing in the direction from the switching element 12 to the switching element 11. Further, as explained previously, at the side of the conductor 52 since the current flowing in the direction from the switching element 12 to the switching element 11 increases, an electromotive force in the direction of canceling out the increase, namely, causing a current in the direction from the switching element 11 to the switching element 12 is induced. Since the polarity of the electromotive force induced in association with the current increase and the polarity of the electromotive force induced by the eddy current are opposite, both operate to cancel out each other. Namely, through the intervention of the eddy current the electromotive force induced by the current decrease at the side of the conductor 54 and the electromotive force induced by the current increase at the side of the conductor 52 canceled out each other. Thereby, the surge voltages induced by these electromotive forces are suppressed.

Further, through substantially the same action as when the current path changes from that of FIG. 6B to that of FIG. 6A, the surge voltage, which is induced when the current path changes from that of FIG. 5B to that of FIG. 5C, is suppressed low.

According to the present embodiment as has been explained hitherto, it is sufficient if only the conductor 56 is enlarged among the many plate shaped conductors necessary for the neutral point clamped 3 level inverter and the other remaining conductors 51 through 55 are formed to have their minimum necessary sizes. For this reason, the structure of the group of the power distribution bus bars can be simplified and the weight thereof is maintained low. Further, since the other conductors 51 through 55 are arranged over one major surface side of the conductor 56, the structure of the group of the power distribution bus bars are further simplified.

Further, according to the present embodiment, since the conductor 56 to which the neutral point voltage is introduced is enlarged and over the surface thereof the other conductors 51 through 55 are arranged, the steady state applied voltage between the conductor 56 and the conductors 51 through 55 is ½ of the DC voltage output from the converter 9. Therefore, an inexpensive insulating material having a low dielectric withstanding voltage can be used as an insulating material to be inserted between the conductors.

In the present embodiment, the conductors 51 through 55 and the conductor 56 are insulated by forming an air layer between the conductors. Alternatively, a plate shaped insulating material having a higher insulating property than that of the air layer can be inserted between the conductors, and the power distribution can be effected by using a laminated conductor plate in which the insulating material and a plurality of power distribution bus bars are secured and integrated. In this instance, since the insulation property of the insulating material is high, the distance between the conductors can be shortened, thereby the currents one of which increases and the other decreases during the commutation period can be placed even close. Accordingly, the surge voltage can be further suppressed.

Further, since the changes of the current paths in the present embodiment are substantially the same as the case where a surge voltage suppressing circuit such as a snubber circuit is provided, the structure according to the present embodiment can be used for the case where the surge voltage suppressing circuit such as a snubber circuit is provided, and thereby a snubber circuit is realized of which loss and size are reduced. Accordingly, a power inverter devices of low loss and high efficiency can be provided.

Still further, although in the present embodiment, the smoothing use capacitors 31 and 32 arranged close to the power inverter circuit comprising the switching elements 11 through 14 and the diodes 21, and 21 is employed, in a case where no smoothing use capacitors are used and DC voltage bus bars are connected to the terminals of the conductors 51, 55 and 56, the inductances of the conductors 51 through 56 can be likewise reduced and the surge voltages can be suppressed.

As has been explained hitherto in the first instance the surge voltages induced during switching of the semiconductor switching elements can be reduced.

According to the second feature the mechanical stability of the device is improved.

According to the third feature, the structure of the power inverter device can be simplified.

We claim:

1. A power inverter device generating at least three different levels of voltages at an AC terminal thereof which comprises a plurality of semiconductor switching elements, diodes and capacitors coupled via a plurality plate shaped conductors, wherein said plurality of plate shaped conductors include a first plate shaped conductor to which is to be applied a highest DC voltage potential, a second plate shaped conductor to which is to be applied a lowest DC voltage potential, a third plate shaped conductor which is to be applied an intermediate DC voltage potential and a fourth plate shaped conductor at which the AC terminal is located, and said plurality of plate shaped conductors other than said third plate shaped conductor are arranged over a face of said third plate shaped conductor via an insulating material.

2. A neutral point clamped 3 level type power inverter device which comprises first through fourth semiconductor switching elements, a first plate shaped conductor which connects the first semiconductor switching element and the second semiconductor switching element in series, a second plate shaped conductor having an AC terminal which connects the second semiconductor switching element and the third semiconductor switching element in series, a third plate shaped conductor which connects the third semiconductor switching element and the fourth semiconductor switching element in series, a capacitor having an intermediate voltage point which is connected in parallel with the series connected first through fourth semiconductor switching elements via fourth and fifth plate shaped conductors, a first diode one terminal of which is connected to the intermediate voltage point of the capacitor via a sixth plate shaped conductor and the other terminal of which is connected to the first plate shaped conductor in a polarity of flowing a forward current from the intermediate voltage point of the capacitor to the first plate shaped conductor, and a second diode one terminal of which is connected to the sixth plate shaped conductor and the other terminal of which is connected to the third plate shaped conductor in a polarity of flowing a forward current from the third plate shaped conductor to the intermediate voltage point of the capacitor, in which the first through fifth plate shaped conductors are arranged over the sixth plate shaped conductor via an insulating material.

3. A power inverter device according to claim 2, wherein the first through fifth plate shaped conductors are arranged on a common plane.

4. A power inverter device according to claim 2, wherein the insulating material is an air layer.

5. A power inverter device according to claim 3, wherein the insulating material is an air layer.

6. A power inverter device according to claim 2, wherein one of the semiconductor switching elements at the most high voltage side and one of the semiconductor switching elements at the most low voltage side among the plurality of the semiconductor switching elements are arranged close to the capacitor.

7. A power inverter device according to claim 3, wherein one of the semiconductor switching elements at the most high voltage side and one of the semiconductor switching elements at the most low voltage side among the plurality of the semiconductor switching elements are arranged close to the capacitor.

8. A power inverter device according to claim 4, wherein one of the semiconductor switching elements at the most high voltage side and one of the semiconductor switching elements at the most low voltage side among the plurality of the semiconductor switching elements are arranged close to the capacitor.

9. A power inverter device according to claim 5, wherein one of the semiconductor switching elements at the most high voltage side and one of the semiconductor switching elements at the most low voltage side among the plurality of the semiconductor switching elements are arranged close to the capacitor.

10. A power inverter device according to claim 2, wherein the first plate shaped conductor is provided with a connection point for the first diode between a connection point of the first semiconductor switching element and a connection point of the second semiconductor switching element.

11. A power inverter device according to claim 3, wherein the first plate shaped conductor is provided with a connection point for the first diode between a connection point of the first semiconductor switching element and a connection point of the second semiconductor switching element.

12. A power inverter device according to claim 4, wherein the first plate shaped conductor is provided with a connection point for the first diode between a connection point of the first semiconductor switching element and a connection point of the second semiconductor switching element.

13. A power inverter device according to claim 5, wherein the first plate shaped conductor is provided with a connection point for the first diode between a connection point of the first semiconductor switching element and a connection point of the second semiconductor switching element.

14. A power inverter device according to claim 6, wherein the first plate shaped conductor is provided with a connection point for the first diode between a connection point of the first semiconductor switching element and a connection point of the second semiconductor switching element.

15. A power inverter device according to claim 7, wherein the first plate shaped conductor is provided with a connection point for the first diode between a connection point of the first semiconductor switching element and a connection point of the second semiconductor switching element.

16. A power inverter device according to claim 8, wherein the first plate shaped conductor is provided with a connection point for the first diode between a connection point of the first semiconductor switching element and a connection point of the second semiconductor switching element.

17. A power inverter device according to claim 9, wherein the first plate shaped conductor is provided with a connection point for the first diode between a connection point of the first semiconductor switching element and a connection point of the second semiconductor switching element.

18. A power inverter device according to claim 2, wherein the third plate shaped conductor is provided with a connection point for the second diode between a connection point of the third semiconductor switching element and a connection point of the fourth semiconductor switching element.

19. A power inverter device according to claim 3, wherein the third plate shaped conductor is provided with a connection point for the second diode between a connection point of the third semiconductor switching element and a connection point of the fourth semiconductor switching element.

20. A power inverter device according to claim 4, wherein the third plate shaped conductor is provided with a connection point for the second diode between a connection point of the third semiconductor switching element and a connection point of the fourth semiconductor switching element.

21. A power inverter device according to claim 5, wherein the third plate shaped conductor is provided with a connection point for the second diode between a connection point of the third semiconductor switching element and a connection point of the fourth semiconductor switching element.

22. A power inverter device according to claim 6, wherein the third plate shaped conductor is provided with a connection point for the second diode between a connection point of the third semiconductor switching element and a connection point of the fourth semiconductor switching element.

23. A power inverter device according to claim 7, wherein the third plate shaped conductor is provided with a connection point for the second diode between a connection point of the third semiconductor switching element and a connection point of the fourth semiconductor switching element.

24. A power inverter device according to claim 8, wherein the third plate shaped conductor is provided with a connection point for the second diode between a connection point of the third semiconductor switching element and a connection point of the fourth semiconductor switching element.

25. A power inverter device according to claim 9, wherein the third plate shaped conductor is provided with a connection point for the second diode between a connection point of the third semiconductor switching element and a connection point of the fourth semiconductor switching element.

26. A power inverter device according to claim 10, wherein the third plate shaped conductor is provided with a connection point for the second diode between a connection point of the third semiconductor switching element and a connection point of the fourth semiconductor switching element.

27. A power inverter device according to claim 11, wherein the third plate shaped conductor is provided with a connection point for the second diode between a connection point of the third semiconductor switching element and a connection point of the fourth semiconductor switching element.

28. A power inverter device according to claim 12, wherein the third plate shaped conductor is provided with a connection point for the second diode between a connection point of the third semiconductor switching element and a connection point of the fourth semiconductor switching element.

29. A power inverter device according to claim 13, wherein the third plate shaped conductor is provided with a connection point for the second diode between a connection point of the third semiconductor switching element and a connection point of the fourth semiconductor switching element.

30. A power inverter device according to claim 14, wherein the third plate shaped conductor is provided with a connection point for the second diode between a connection point of the third semiconductor switching element and a connection point of the fourth semiconductor switching element.

31. A power inverter device according to claim 15, wherein the third plate shaped conductor is provided with a connection point for the second diode between a connection point of the third semiconductor switching element and a connection point of the fourth semiconductor switching element.

32. A power inverter device according to claim 16, wherein the third plate shaped conductor is provided with a connection point for the second diode between a connection point of the third semiconductor switching element and a connection point of the fourth semiconductor switching element.

33. A power inverter device according to claim 17, wherein the third plate shaped conductor is provided with a connection point for the second diode between a connection point of the third semiconductor switching element and a connection point of the fourth semiconductor switching element.

* * * * *